(12) United States Patent
Mehta

(10) Patent No.: US 10,803,237 B2
(45) Date of Patent: Oct. 13, 2020

(54) SYSTEMS AND METHODS FOR DATA ENTRY INTO A REGION OF A DISPLAY

(71) Applicant: NetSuite Inc., San Mateo, CA (US)

(72) Inventor: Suhas R. Mehta, Santa Clara, CA (US)

(73) Assignee: NetSuite, Inc., Redwood Shores, CA (US)

( * ) Notice: Subject to any disclaimer, the term of this patent is extended or adjusted under 35 U.S.C. 154(b) by 76 days.

(21) Appl. No.: 15/278,752

(22) Filed: Sep. 28, 2016

(65) Prior Publication Data

US 2018/0089158 A1  Mar. 29, 2018

(51) Int. Cl.
*G06F 40/174* (2020.01)
*G06F 40/274* (2020.01)
*G06F 3/0489* (2013.01)

(52) U.S. Cl.
CPC .......... *G06F 40/174* (2020.01); *G06F 3/0489* (2013.01); *G06F 40/274* (2020.01)

(58) Field of Classification Search
CPC .. G06F 3/0487; G06F 3/0489; G06F 17/2705; G06F 40/174; G06F 40/274
See application file for complete search history.

(56) References Cited

U.S. PATENT DOCUMENTS

| | | | | |
|---|---|---|---|---|
| 5,617,527 A * | 4/1997 | Kressin | ................ | G06F 3/0481 715/781 |
| 5,694,562 A * | 12/1997 | Fisher | ................ | G06F 3/04817 715/810 |
| 5,796,404 A * | 8/1998 | Gentner | ................ | G06F 3/0489 345/168 |
| 5,990,862 A * | 11/1999 | Lewis | ................ | G06F 3/038 715/858 |
| 6,078,323 A * | 6/2000 | Gest | ................ | G06F 3/04817 345/172 |
| 6,169,984 B1 * | 1/2001 | Bogdan | ................ | G06F 3/04842 |
| 6,651,217 B1 * | 11/2003 | Kennedy | | |
| 6,959,422 B2 * | 10/2005 | Slaunwhite | ................ | G06F 3/023 345/172 |
| 7,096,425 B1 * | 8/2006 | Takahashi | ................ | G06F 17/243 715/222 |
| 7,127,679 B2 * | 10/2006 | Cohen | ................ | G06F 9/451 715/744 |
| 7,406,657 B1 * | 7/2008 | Callaghan | ................ | G06Q 10/10 715/225 |
| 7,426,496 B2 * | 9/2008 | Kristjansson | ................ | G06F 17/243 706/10 |
| 7,549,130 B2 * | 6/2009 | Keim | ................ | G06F 3/0489 345/172 |
| 7,698,342 B1 * | 4/2010 | Evans | | |
| 7,735,023 B1 * | 6/2010 | Chadzelek | ................ | G06F 3/0489 715/767 |
| 7,853,875 B2 * | 12/2010 | Cohen | ................ | G06F 9/451 715/273 |
| 7,958,449 B2 * | 6/2011 | Chen | | |

(Continued)

*Primary Examiner* — Kavita Padmanabhan
*Assistant Examiner* — Tyler Schallhorn
(74) *Attorney, Agent, or Firm* — Kraguljac Law Group, LLC

(57) ABSTRACT

Improved methods for navigation between fields in a form or other document, and a more efficient process for data entry by a user. In some embodiments, techniques are used to convert or associate unstructured data entries with corresponding fields or regions into which the data should be placed.

18 Claims, 9 Drawing Sheets

(56) References Cited

U.S. PATENT DOCUMENTS

| | | | |
|---|---|---|---|
| 8,745,162 B2* | 6/2014 | Weber | G06F 16/58 709/219 |
| 9,369,443 B1 | 6/2016 | Sinor | |
| 9,507,519 B2* | 11/2016 | Bilgen | G06F 3/04886 |
| 9,733,921 B1 | 8/2017 | Saenz et al. | |
| 9,817,991 B2 | 11/2017 | Boncha et al. | |
| 9,892,467 B2 | 2/2018 | Shak et al. | |
| 10,175,776 B2* | 1/2019 | Vecera | G06F 3/0233 |
| 2002/0075317 A1* | 6/2002 | Dardick | G06F 3/0481 715/808 |
| 2003/0004983 A1* | 1/2003 | Cohen | G06F 9/451 715/205 |
| 2003/0090471 A1* | 5/2003 | Slaunwhite | G06F 3/023 345/172 |
| 2003/0234822 A1* | 12/2003 | Spisak | G06F 3/0235 715/827 |
| 2004/0104944 A1* | 6/2004 | Koay | G06F 3/0489 715/827 |
| 2004/0196314 A1* | 10/2004 | Bhogal | G06F 3/04892 715/780 |
| 2005/0005234 A1* | 1/2005 | Chen | |
| 2005/0091578 A1* | 4/2005 | Madan | G06F 17/241 715/201 |
| 2005/0198563 A1* | 9/2005 | Kristjansson | G06F 17/243 715/224 |
| 2006/0117271 A1* | 6/2006 | Keim | G06F 3/0489 715/789 |
| 2006/0150110 A1* | 7/2006 | Dietl | G06F 16/957 715/760 |
| 2007/0035523 A1* | 2/2007 | Cohen | G06F 9/451 345/169 |
| 2008/0028289 A1* | 1/2008 | Hicks | G06F 17/243 715/224 |
| 2008/0052372 A1* | 2/2008 | Weber | G06F 16/58 709/217 |
| 2008/0082909 A1* | 4/2008 | Zuverink | G06F 3/0481 715/224 |
| 2009/0313581 A1* | 12/2009 | Martin | G06F 3/04892 715/827 |
| 2012/0127078 A1* | 5/2012 | Vecera | G06F 3/0233 345/168 |
| 2014/0280048 A1* | 9/2014 | Bumgarner | G06F 3/0489 707/722 |
| 2015/0243288 A1* | 8/2015 | Katsuranis | G06F 3/0484 704/275 |
| 2017/0090686 A1* | 3/2017 | Blumenkron Hurtado | G06F 3/0482 |
| 2017/0235735 A1 | 8/2017 | Ignatyev et al. | |

* cited by examiner

Structured Date Entry Using Notepad
*Required

Name*      402
Enter your name here

Gender*
○ Male
○ Female

403
Data Entry Fields   ①

Self Introduction*
Provide an introduction statement about yourself.

Date of Birth
Enter your birth date here (DD-MMM-YYYY)

Action Field   ②
404

Email ID

Instruction Shell   ③
406

Submit   ④

Search Mode ...     System Text
    Name
Date Entry Mode ...     User entered Field Search Text   ⑤
    Type your data here...
Esc Key     User Entered Date Entry Text   ⑥
Back to Search Mode...
    Submit
Action Mode...     "Esc" to get back into Search Mode   ⑦

```
<div class="ss-top-of-page">
  <div class="ss-form-heading">
    <h1 class="ss-form-title" dir="ltr">Structured Data Entry using Notepad</h1>
    <div class="ss-required-asterisk" aria-hidden="true">* Required</div>
</div>
<div class="ss-form">
  <form action="https://docs.google.com/forms/d/e/1FAIpQLSd2j92O2PCRG5vgydKAfvtkixuRgiGWHDmOhXoSR-K2CQwTeA/formResponse" method="POST" id="ss-form" target="_self" onsubmit="">
    <ol role="list" class="ss-question-list" style="padding-left: 0;">
      <div class="ss-form-question errorbox-good" role="listitem">
        <div dir="auto" class="ss-item ss-item-required ss-text">
          <div class="ss-form-entry">
            <label class="ss-q-item-label" for="entry_1461781338">
              <div class="ss-q-title">Name
                <label for="itemView.getDomIdToLabel()" aria-label="(Required field)"></label>
                <span class="ss-required-asterisk" aria-hidden="true">*</span>
              </div>
              <div class="ss-q-help ss-secondary-text" dir="auto">Enter your name here</div>
            </label>
            <input type="text" name="entry.1461781338" value="" class="ss-q-short" id="entry_1461781338" dir="auto" aria-label="Name Enter your name here " aria-required="true" required="" title="">
            <div class="ss-error-message" id="i914474878_errorMessage"></div>
            <div class="required-message">This is a required question</div>
          </div>
        </div>
      </div>
    </div>
    <div class="ss-form-question errorbox-good" role="listitem">
      <div dir="auto" class="ss-item ss-item-required ss-radio">
        <div class="ss-form-entry">
          <label class="ss-q-item-label" for="entry_2131765910">
            <div class="ss-q-title">Gender
              <label for="itemView.getDomIdToLabel()" aria-label="(Required field)"></label>
              <span class="ss-required-asterisk" aria-hidden="true">*</span>
            </div>
            <div class="ss-q-help ss-secondary-text" dir="auto"></div>
          </label>
```

```
191  <div id="spn_cRdi" class="ns-user ns-menuitem ns-submenu ns-header">
192    <a>
193      <div class="ns-icon" onclick="document.location = Yapp/center/myroles.nl;"></di
194      <div class="ns-role">
195        <span>Doe, John</span>
196        <span>
197          <span class="ns-role-company">Spock Inc.</span>
198          <span class="ns-role-name">Event Committee</span>
199        </span>
200      </div>
201    </a>
202  <ul class="ns-menu">
203
204    <li class="ns-menuitem ulr-menuitem-signout">
205      <a href="/pages/allogoutAoback.jsp">
206        <span>Sign Out</span><span class="icon-signout"> </span>
207      </a>
208    </li>
209
210    <li class="ns-menuitem ulr-menuitem-viewall">
211      <a href="/app/center/myroles.nl">
212        <span>View All Roles</span>
213      </a>
214    </li>
215
216    <li class="ns-menuitem">
217      <a href="/app/login/dashboard.nl?id=5166050s1h-324e2643h-ee2d4a0a1c">
218        <span>2014 Sprint of Dreams - Team Marina - Administrators/>
219      </a>
220    </li>
221
222    <li class="ns-menuitem"> 224
223      <a href="/app/login/dashboard.nl?id=50055416fh-37e8bd47c81f23ce6a6c">
224        <span>Spock Inc. - Employee Centers</span>
225      </a>
226    </li>
227    <li class="ns-menuitem">
228      <a href="/app/login/dashboard.nl?id=50055isi11-c00f14iase1d78f6sh">
229        <span>Spock Inc. - Product Manager</span>
230      </a>
231    </li>
232    <li class="ns-menuitem">
233      <a href="/app/login/dashboard.nl?id=10405907w=40da1869dc0546640">
234        <span>Spock Inc. - Event Committee</span>
235      </a>
236    </li>
```

SYSTEMS AND METHODS FOR DATA ENTRY INTO A REGION OF A DISPLAY

BACKGROUND

When a data entry form has a relatively large number of fields (for example, 10 or more) in which data may be entered, it is not only tedious to complete the data entry operations, but also inefficient in the sense of the time required to perform the data entry or data updating operations. For example, it typically takes a user many potentially unnecessary key-strokes or mouse movements merely to navigate from one section of a form to another. Many a times, the designer of the form has arranged the fields in a certain order, which are not necessarily the order in which the information is supplied to the user performing the data entry, or do not represent an intuitive sequence of regions into which a user would naturally place data. As a result, the user may be required to go back and forth between fields to enter the correct value(s) in the correct places. In addition, a significant amount of time may be wasted during the actual data entry process. As with navigating between fields of a form, not all of the options or functionality desired may be available at once or by using a simple operation because action items are often hidden or nested within a menu-submenu hierarchy. Accessing these options typically requires use of a mouse or a pointing device, introducing additional operations and inefficiencies into the overall process of data entry into the desired fields or regions.

Thus, in general, conventional approaches to providing a user with the ability to navigate between data fields and to enter data into a selected field or fields are subject to one or more of the following limitations or disadvantages:
 The data entry is done all across the form in multiple individual fields;
 Certain fields may be relatively easy to enter data into (or perform actions on) using one or more specified keyboard shortcuts;
 Navigation typically requires use of a pointing device;
 Developers typically have to construct unique keyboard shortcuts for certain field navigation functions or form actions; and
 The conventional techniques used to expedite data entry typically only work well for a relatively small/simple data entry form.

Embodiments of the inventive system and methods are directed to overcoming the limitations associated with conventional approaches to navigating the data entry fields in a form and entering the data into the desired field or fields, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention provide improved methods for navigation between fields in a form or other document, and a more efficient process for data entry by a user. In some embodiments, the inventive techniques may be used to convert or associate unstructured data entries with corresponding fields or regions into which the data should be placed.

In some embodiments of the inventive system and methods, navigation within the fields of, and data entry for, forms or other sets of data fields may be improved by one or more of the following aspects of the inventive system and methods:
 A single, relatively small region for the data entry; this has the advantage that no use of the "Tab" key, or of a mouse/pointer inputs or actions are needed to change focus from one field to another;
 No keyboard shortcuts are required either for data entry or for performing actions;
 Form and application navigation is easily controlled by use of a keyboard without the typical dependence on the "Tab" key and/or keyboard shortcuts, or in some cases without the use of a mouse or a pointing device;
 Developers need not worry (or be as concerned) about field, form or application navigation when creating applications because the user's keyboard, in conjunction with the inventive system and methods, will manage those aspects; and
 Embodiments of the inventive system and methods will work for any kind of data entry form—simple or complex; large or small.

In general, embodiments of the inventive system and methods will enable a user to more easily and efficiently:
 Perform complex data entry operations primarily by using a keyboard, without the need (in many cases) of a pointing device;
 Improve the data entry efficiency of the user;
 Adapt to the change in the user navigation or data entry experience with minimal training; and
 Utilize the inventive navigation or data entry paradigm for any web-based data entry form or similar document.

In one embodiment, the invention is directed to a system for generating a user interface, where the system includes:
 an electronic data storage element;
 a set of executable instructions contained in the data storage element;
 an electronic processor, which when programmed to execute the set of instructions causes the system to
  generate a display including a first region into which unstructured data or text may be entered and a second region containing one or more of a field into which structured data or text is to be inserted or a selectable element that when selected, initiates an action, or both;
  detect entry of text, a text string, or an alphanumeric character or string by a user in the first region;
  in response to detecting entry of the text, text string, or alphanumeric character or string, performing a search process to identify an occurrence of the entered text, text string, or alphanumeric character or string, the search process being performed over one or more identifiers associated with the one or more fields into which structured data is to be inserted and over one or more identifiers for the selectable elements in the second region;

if the result of the search is a unique match, then determining if the unique match corresponds to an identifier associated with a field into which structured data is to be inserted or to an identifier for a selectable element that when selected, initiates an action;

if the unique match is an identifier for a field, then receiving a command or instruction from the user to accept the entered text, text string, or alphanumeric character or string in the field associated with the identified occurrence, and in response, inserting the entered text, text string, or alphanumeric character or string into the field; and if the unique match is an identifier for a selectable element, then receiving a command or instruction from the user to execute a specific process by selection of the element, wherein the executed process causes the initiation of the action.

In another embodiment, the invention is directed to a method of interacting with a user of a device, where the method includes:

generating a display including a first region into which unstructured data or text may be entered and a second region containing one or more of a field into which structured data or text is to be inserted or a selectable element that when selected, initiates an action, or both;

detecting entry of text, a text string, or an alphanumeric character or string by the user in the first region;

in response to detecting entry of the text, text string, or alphanumeric character or string, performing a search process to identify an occurrence of the entered text, text string, or alphanumeric character or string, the search process being performed over one or more identifiers associated with the one or more fields into which structured data is to be inserted and over one or more identifiers for the selectable elements in the second region;

if the result of the search is a unique match, then determining if the unique match corresponds to an identifier associated with a field into which structured data is to be inserted or to an identifier for a selectable element that when selected, initiates an action;

if the unique match is an identifier for a field, then receiving a command or instruction from the user to accept the entered text, text string, or alphanumeric character or string in the field associated with the identified occurrence, and in response, inserting the entered text, text string, or alphanumeric character or string into the field; and if the unique match is an identifier for a selectable element, then receiving a command or instruction from the user to execute a specific process by selection of the element, wherein the executed process causes the initiation of the action.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIG. 4 is a diagram illustrating an example of a user interface or display that includes a set of data entry fields and a region for entry of unstructured data and/or commands, and represents an implementation of an embodiment of the inventive system and methods;

FIG. 7 is a diagram illustrating an example of the client-side HTML code for creating the data entry form section in a complex enterprise application, and that may be used when implementing an embodiment of the inventive system and methods;

FIG. 8 is a diagram illustrating an example of the client-side HTML code for creating the UI navigation section in a complex enterprise application, and that may be used when implementing an embodiment of the inventive system and methods.

Note that the same numbers are used throughout the disclosure and figures to reference like components and features.

DETAILED DESCRIPTION

Figure 1:
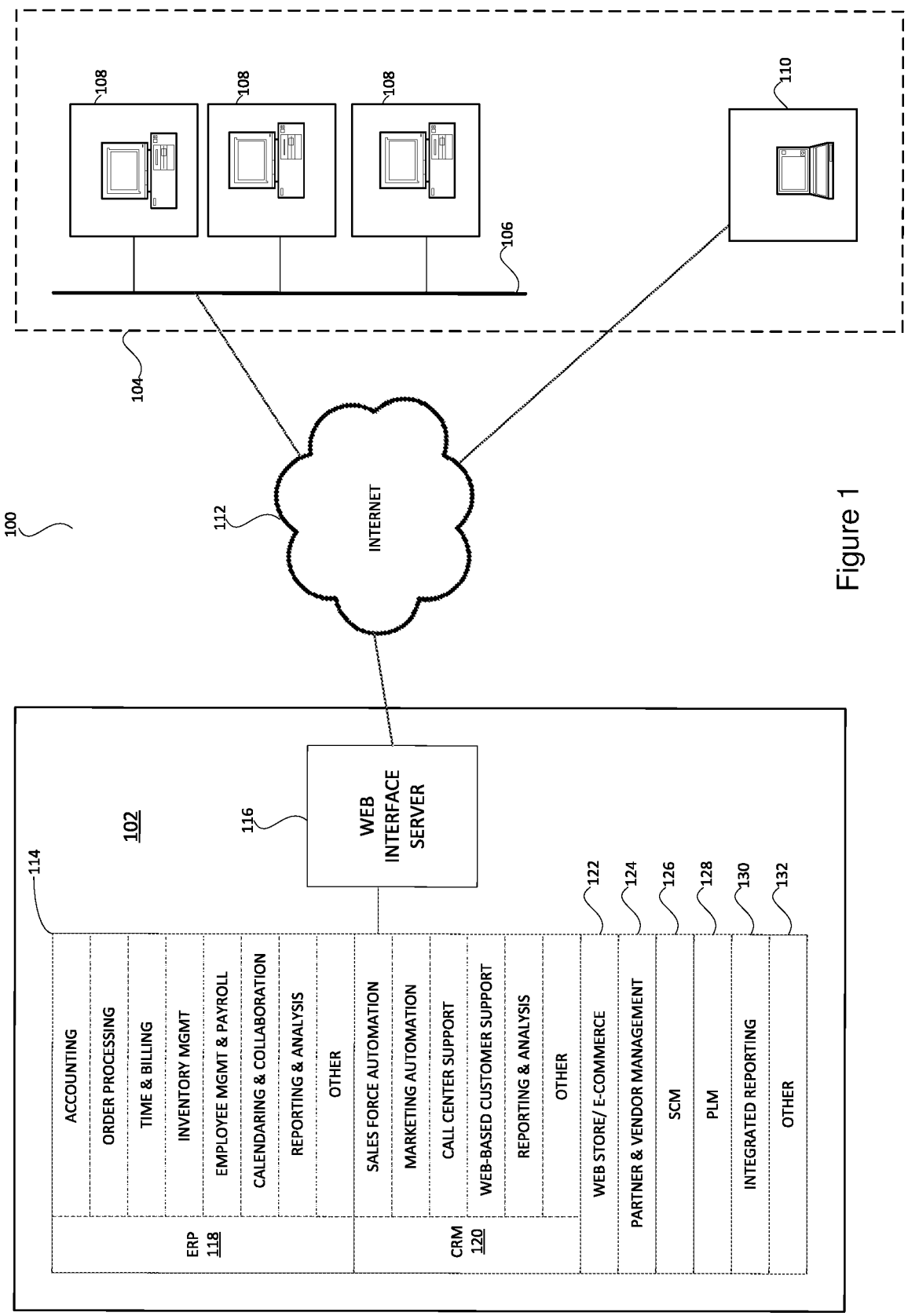
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

One example of an environment or architecture in which an embodiment of the inventive system and methods may prove useful is that of a system or platform in which a user needs to provide data for a relatively large number of fields or regions in a form, webpage, or document. Such a situation typically arises in cases where a data entry process may involve multiple choices, sub-menus, or possible entries across multiple fields. One such situation is that of an eCommerce website; another is that of a search or reporting process being implemented on the data contained in a database. This type of use case may arise in a multi-tenant architecture or data processing platform, for example.

As a further example, in the case of an enterprise application such as a customer service application (which may be implemented as part of a single tenant, or a multi-tenant system), the time-savings and efficiencies realized by using an embodiment of the inventive methods may be significant. Typically in such an application, not all of the visible fields are mandatory to enter data into and not all of the mandatory fields may be visible to a user performing data entry. This may cause the user to miss certain fields during data entry and result in an error when trying to submit the form for processing. In some cases, even the resulting error message may be hidden or be misleading.

A multi-tenant architecture provides a means for multiple accounts (tenants) and users to store and access their data, and to utilize specific applications that reside on a remote platform. The platform is typically implemented as a set of servers or server groups, and is administered and operated by another party that provides use of the platform infrastructure as a service to the accounts and each account's users. This service may provide data storage, computational processing power, data analytics, and applications or workflows that may be executed with reference to an account's data (in whole or in part, and account-wide or user-specific). In some cases, such services have been described as Software-as-a-Service (SaaS), cloud-based services, web-services, or remote services.

The applications that reside on a platform may be used to process certain of a user's data by instantiating an occurrence of the application within the user's account; for these types of uses, the applications may include ones utilized to operate a business, such as ERP, CRM, HR (HCM), eCommerce, and financial applications. Tenant customizations to the operation of the architecture may include custom functionality (such as the capability to perform tenant or user-specific functions, workflows, data processing, or operations) built on top of lower level operating system functions.

Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

In some embodiments, the inventive system and methods provide improved techniques for navigation and/or data entry for users of a multi-tenant data processing platform or system. One or more of the inventive techniques enable a user to more efficiently enter data into a document or form, generate a search or report query more easily, and in general to convert unstructured data entries made on a "notepad" into properly formatted entries in one or more appropriate data fields or regions.

Note that although an example environment in which an embodiment of the inventive system and methods is that of a multi-tenant platform used to deliver Software-as-a-Service (SaaS), other computing or data processing architectures may also benefit by using an embodiment of the invention. For example, embodiments of the invention may be implemented in the context of other computing or operational environments or systems, such as for an individual business data processing system, a private network used with a plurality of client terminals, a remote or on-site data processing system, another form of client-server architecture, a system in which mobile devices (or other devices having similar viewing or data entry limitations) are used to complete relatively complicated forms, etc.

In order to facilitate some use cases, an embodiment of the inventive user interface and associated methods may be implemented as a standard function of a browser (for e.g., in HTML 6.0) so that the functional capabilities of the user interface are available for use by default with each web-page. This may be very convenient, as embodiments of the invention support the navigation use-case as well as the data entry use-case, with one or both typically required in order to interact with a web-page.

As noted, in some embodiments, the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 1-3.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management (HR or HCM), and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 2:
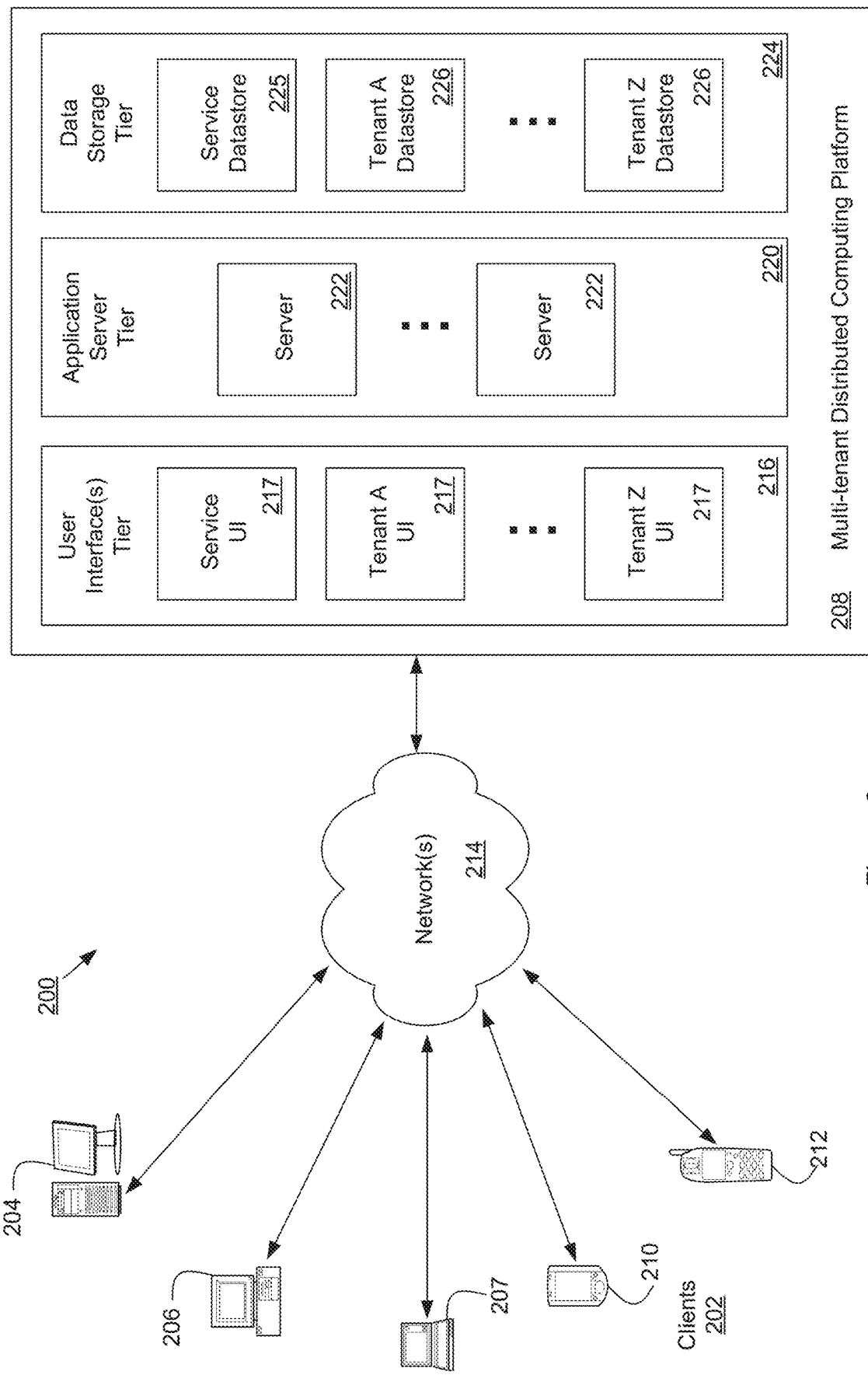
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system (e.g., its user interfaces, applications, or workflow) to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a third party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer (or in some cases, an operator of the platform) may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

As one example, an embodiment of the inventive methods for providing more efficient navigation and/or data entry may be implemented as an extension to the user interface(s) available to a tenant or tenants of a multi-tenant platform. In this way, the benefits of the inventive system and methods may be provided to a selected set of the accounts, tenants, or users of the platform. For example, if an embodiment is not implemented as a default or optional browser function or plug-in, then the capabilities may be made a feature that is enabled by a system administrator at the appropriate tenant level, for a specific use role, for users participating in a specific task, or as a user preference, etc. In another example, an embodiment could also (or instead) be enabled for use with a specific (or set of) forms, documents, or pages.

Figure 3:
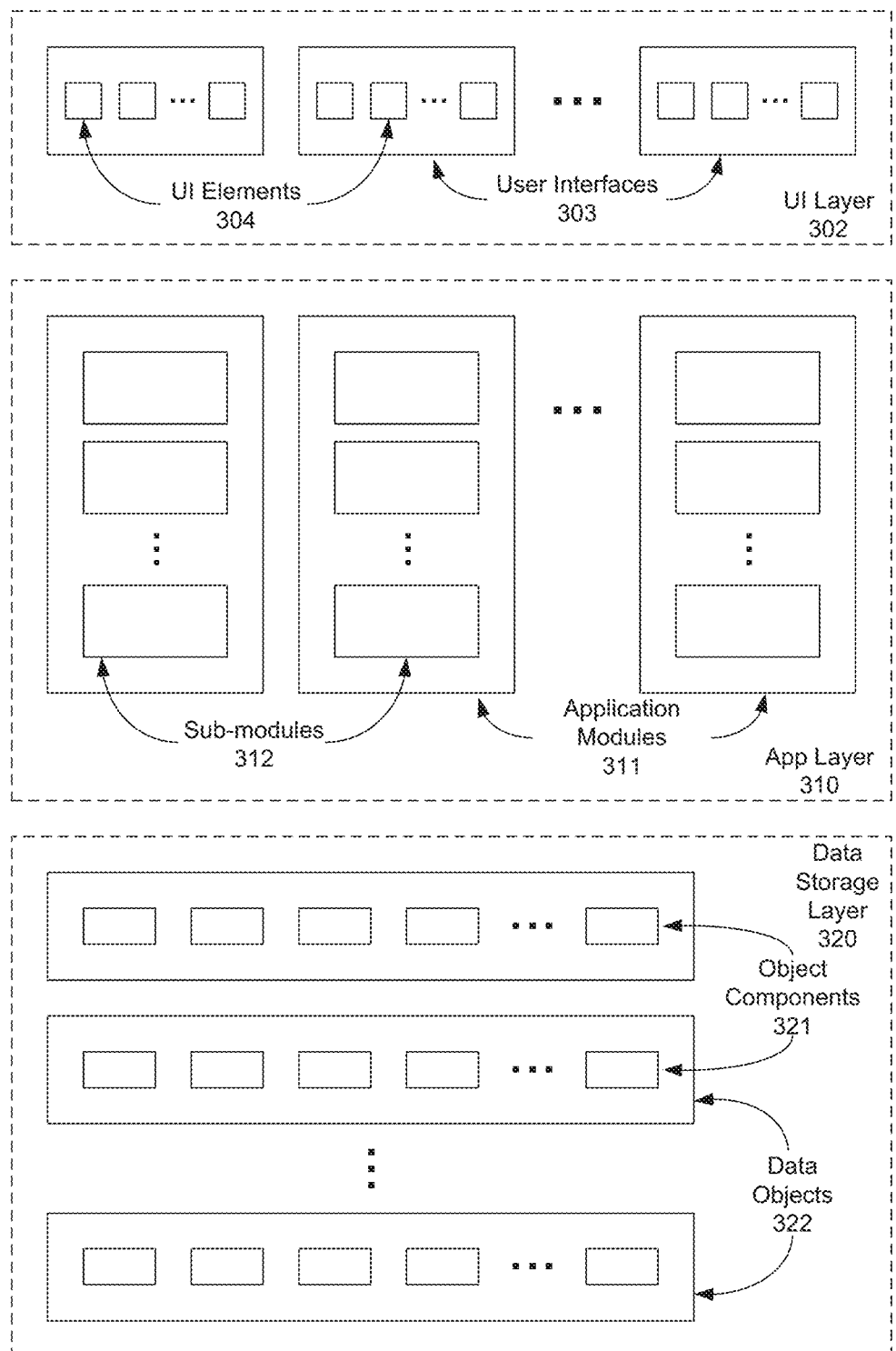
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented (at least in part) using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational entity or element.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as in order to:

- Generate a display for a user that includes a region for unstructured data entry by the user;
  - Permit the user to enter text or alphanumeric data into the unstructured data region;
  - Permit the user to execute a search operation to find one or more fields or regions of a form or document that would be expected to be appropriate for containing the unstructured data;
  - Permit the user to execute an operation to insert the unstructured text into a specific field or region;
- Permit the user to switch or toggle between one or more possible operations, functions, modes, or processes;
  - Permit the user to execute one or more other possible features, functions, modes, or operations, such as
    - If the system supports a "Post-It"® or "sticky note" like feature for annotating a field label or description (or a value in the field); this could be enabled via the invention to record/capture data entry that will be submitted and stored in the server/database;
    - A capability to enable a "design mode" for purposes of online form design; this could be used, for example, to add a new text box to the form;
    - Depending on the implementation, a browser window may be partitioned using iframe so that the majority of a webpage is used to display the main application form/page, with a smaller portion used for the inventive "notepad";
- Execute a search for specific text or alphanumeric string over a set of "HTML tags", or attributes such as labels, identifiers, commands, markup language control terms, or other similar or equivalent elements;
- In some implementations or use cases, there may be a need to develop/add a JAVAScript library (or libraries) that would be able to access and examine the HTML code in a browser and perform actions on the client device; separate libraries may be created for each "mode" so that the capabilities may be added/removed as necessary;

To improve performance, the requisite script library may only be loaded when the "notepad" is turned ON or otherwise made available; otherwise, the browser may skip loading the library, thereby saving bandwidth and providing higher performance.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

As noted, the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include those having devices (including mobile devices), software applications, systems, apparatuses, networks, or other configurable components that may be used by multiple users for data entry, data processing, application execution, data review, etc. and which have user interfaces or user interface components that can be configured to present a suitable interface to a user.

Thus, although further examples below may reference the example computing environment depicted in FIGS. 1-3, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a browser "plug-in", an extension to the functionality of a data processing system or platform, or any other suitable form.

General Implementation Details

In a general implementation of an embodiment of the inventive system and methods, a user will be presented with a region or "notepad" into which the user may insert unstructured data, such as text. Data entry into the "notepad" region will allow a user to initiate a navigation process for the fields in a form, document, or webpage, insert entered data into a desired field, and/or execute a desired action or operation.

Prior to describing the implementation of one or more embodiments of the inventive system and methods, it is noted that the following terms as used herein have at least the indicated meaning:

Data Entry Notepad (may be referred to as Command Prompt, Terminal, or Instruction Shell or Power-User Shell or Shell):

An instruction shell window inside of a web-browser that stays open, particularly when a webpage is a data entry form; ideally, such a frame takes up no more than 20% of a full browser window, although this may be varied depending on the circumstances;

Search Mode:
  The instruction shell window inside of a web-browser that operates to identify matching text in the source code/tags/attributes/identifiers of a webpage; typically, the inventive system and interface will execute a search over the HTML tags and attributes;

Data Entry Mode:
  The instruction shell window inside of a web-browser that operates to detect a unique search-hit as an input field, and in response place the cursor in the field that was located on the webpage; the inventive system and interface then operates to copy the text entered, thereafter, inside the shell (in this mode) into the corresponding field on the webpage; and Action Mode:
  The instruction shell window inside of a web-browser that operates to detect a unique search-hit as an actionable field on the webpage, and in response place the cursor on the field; the inventive system and interface then operates to transfer the "enter" key stroke in the instruction shell into a "submit" (or equivalent) action on the webpage.

In some embodiments, the inventive system and methods may be implemented in the form or structure of a region on the user interface that is presented to a user when they access an application, webpage, document, form, etc. In some implementations, the "notepad" region on the user interface may be generated using a browser, while in others it may be generated without using a browser. The region will be used by the user/data entry operator to enter data (typically text or alphanumeric characters) and initiate the execution of one or more possible functions or operations, including but not limited to a search, entering data, navigating between fields, entering into a "custom" mode, etc.

For example, such a custom mode may be used for purposes of associating a note or comment with entered text or a section of a form (this mode may be referred to as a "Post-It"® mode or "sticky note" mode); in this example, a user might perform the following keystrokes to access and use the custom mode and to thereby associate an object with text or a field:
  1. Press "ccc" to enter "custom" mode;
  2. Type the JAVAScript-like command to access the desired mode—"new Postit( )"
  3. Type ";" followed by <Enter> will submit the code snippet to the server to execute; a user may add multiple lines of JAVAScript lines before concluding it with ";" and <Enter>.

Another type of "custom" mode might be a "form assembly" mode that permits a user to select a set of fields for use in a form or template. Yet another "custom" mode might be a "debug" mode where the print statements from the client-side scripts (JAVAScript) would be written into the notepad, thereby helping a developer to see how their code is getting executed on the page. In general, the custom mode(s) refer to operating modes that may be activated or accessed, and are in addition to the "search", "enter data", "action", or other modes mentioned when describing the standard operation of the embodiments of the invention.

In some embodiments, a user may be presented with a user interface that includes the inventive "notepad" and related processes when the user launches or otherwise accesses an application or links to a webpage. The user interface may include a region containing a form, a data entry field, a set of data entry fields, or document, and a region representing the inventive "notepad". An example of such an interface is shown in FIG. 4, which is a diagram illustrating an example of a user interface or display that includes a set of data entry fields and a region for entry of unstructured data and/or commands, and represents an implementation of an embodiment of the inventive system and methods.

As shown in the figure, a user interface 400 may include a region 402 displaying one or more data fields 403 representing data entry fields or data entry controls for structured data. In the example shown, these are represented by a Name field, a Gender selection button, a Self-Introduction text block, a Date of Birth field, and an Email ID. In addition to the data entry fields is an Action Field 404; this represents an activate-able button or other element that can be used by the user to initiate an action, event, process, etc.

In addition to region 402, user interface/display 400 also includes what is identified as an Instruction Shell 406 in the figure. Instruction Shell 406 represents an example embodiment of the inventive "Notepad" or a portion of such an element. In the example embodiment shown in the figure, Instruction Shell 406 includes a region or regions into which unstructured data may be entered, with some of the regions being associated with an indicated operation or function (such as "Search Mode", "Data Entry Mode", "Esc Key", or "Action Mode"), for example.

Note the following aspects or elements of the operation of user interface 400 (the numbered items below correspond to the numbered circles shown on the figure):
  1. The sample data entry form includes a textbox, radio-buttons, and a text area;
  2. The form includes an action item—the Submit button;
  3. The data entry form, whether rendered by a browser or otherwise, will include a built-in Unstructured Editable Notepad 406. In this Notepad the user is able to perform a search over the page/region/form above, perform data entry into the data fields, or initiate an identified action on the form;
  4. By default, the Notepad runs in the Search Mode. The system identifies the current mode to help the user be aware of the current state of use;
  5. When in Search Mode, any text typed into the Notepad will be used to search for matching text on the page/region/form above (i.e., region 402 in the figure);
  6. If the searched for text is found on the page above and it is associated with a data entry field, then the system will automatically place the cursor in the field and enter into Data Entry Mode; and
  7. When the data entry is completed, the user may go back to the Search Mode by pressing the "Esc" key on the keyboard; this will cause the system to return to the Search Mode.

Although FIG. 4 is just one example of the user interface and associated processes that may be generated by an embodiment of the inventive system and methods, it displays the following typical aspects and advantages:
  1. There is a single point of focus for the data entry user on the UI—this presents a significantly simpler and more readily understandable UI to the user;
  2. The end-user may use an embodiment of the inventive unstructured "Notepad" to execute an operation (e.g., initiate an action) or to determine the data used for placement into the appropriate field or region of a form or document:
    a. Navigation within the form or document;
    b. Display of an application-based form or document;
    c. The form may have multiple fields for entry of structured data;

d. Each field may be one into which structured data is to be placed or inserted; and 3. When the information is coming in a random order from an information source, the data entry user does not have to be concerned with Tabbing (or shift+Tabbing) through a series of fields/links in order to either navigate through the complex application or to complete the entry of text into a form that is currently open.

Upon execution of the "Search" function, the inventive user interface will execute a process to search for/identify the text entered into the "Notepad" in the HTML tags associated with the regions of the form or document into which structured text or data is expected to be entered. This may include such tags as <H1> . . . <H6>, <UL>, <LI>, <P> <B> <I> <U>, <SPAN>, etc. The inventive user interface may also search for the text entered into the "Notepad" in the tag attributes, such as ID, LABEL, NAME, etc.

In some embodiments, the inventive system will not search the tags themselves; as an example, if a user types in "Span" the system will highlight (or otherwise identify) a match where the text ("Span") is not part of an HTML tag. In this embodiment or implementation, the system will not search the <SPAN> tag label, but will look inside the tag for a match. Thus, when a user types "span" in the notepad while in search mode, the system will look for:

<span style="spandex">Spandex<input id="spandan"></input></span>

Notice that the system skips the tag name and the content of a specific attribute like 'style', which are frequently recurring; but, it will search/look under the 'id' attribute as well as the contents of the tag (note that searching for the "id" attribute may be of value to a user because it is expected to be unique).

When the searched for text is part of an HTML tag such as <INPUT>, <FORM> (additionally, the system may also be sensitive to tag attributes such as TYPE), the system switches the Instruction Shell mode to "Data Entry Mode". When the searched text is part of an HTML tag such as <A>, the system switches the Instruction Shell (the "Notepad") to "Action Mode".

Figure 5:
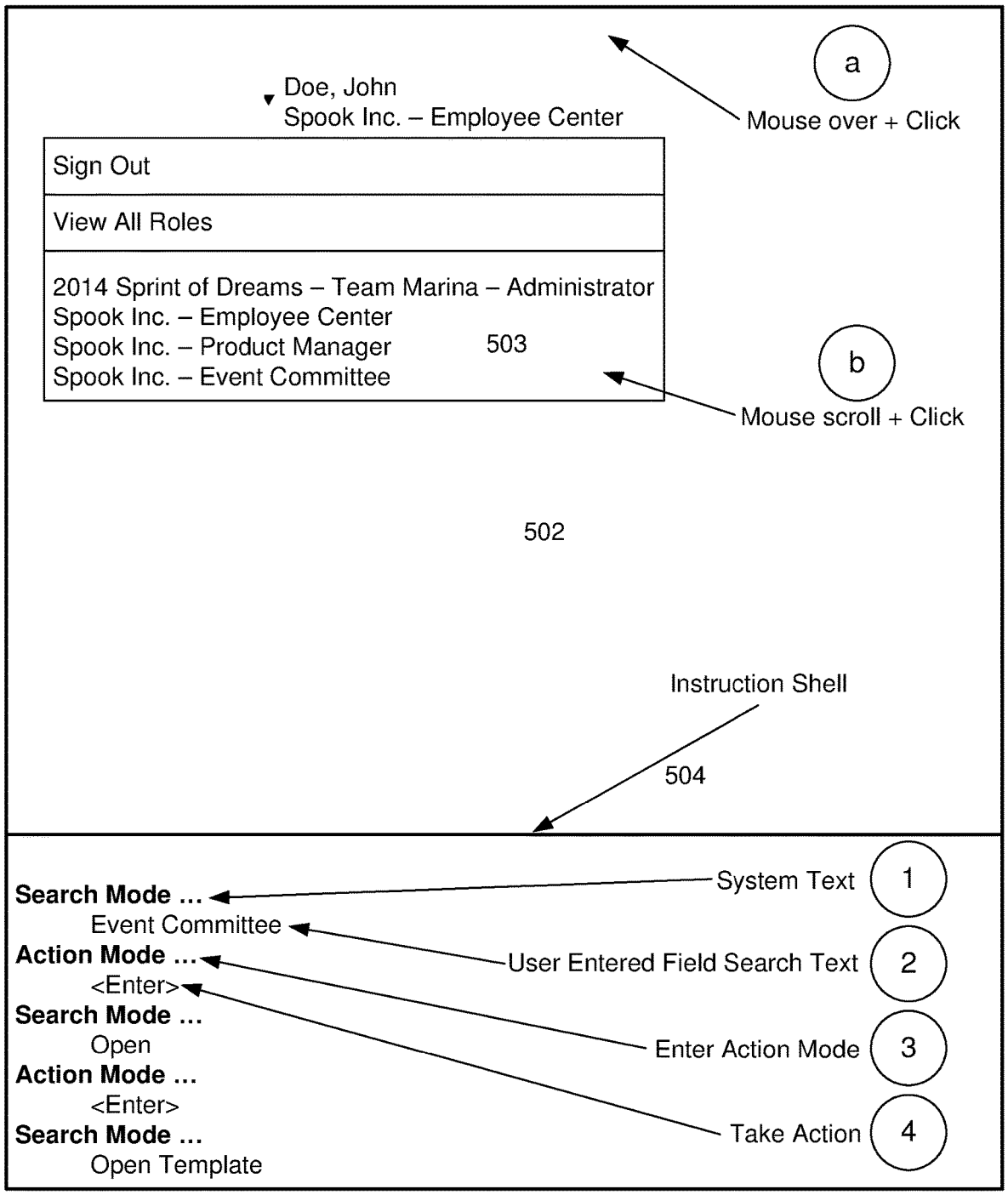
FIG. 5 is a diagram illustrating an example of a user interface or display that may be used for purposes of navigating through the displays of an application, and represents an implementation of an embodiment of the inventive system and methods.

FIG. 5 is a diagram illustrating an example of a user interface or display 500 that may be used for purposes of navigating through the displays of an application, and represents an implementation of an embodiment of the inventive system and methods. In the example shown in the figure, interface/display 500 includes a region 502 in which is displayed one or more items arranged in a selectable menu or sub-menu 503. The selectable items may include one or more data items (such as the roles of "Product Manager" or "Event Committee" shown as examples, Contact-Employee-New to submit or obtain contact data for a new employee), and/or an action or operation that may be initiated by the user (such as "Sign Out", File Open). Interface 500 also includes what is identified as an Instruction Shell 504 in the figure. Instruction Shell 504 represents an example embodiment of the inventive "Notepad" or a portion of such an element. In the example embodiment shown in the figure, Instruction Shell 504 includes a region or regions into which unstructured data may be entered, with some of the regions being associated with an indicated operation or function (such as "Search Mode", "Data Entry Mode", "Esc Key", or "Action Mode"), for example.

Note the following aspects or elements of the operation of user interface 500 (the numbered items below correspond to the numbered circles shown on the figure):

Note that in this example, the user wants to change the role from "Spook Inc,—Employee Center" to "Spook Inc.—Event Committee";

a. In a typical application, the user is required to move a mouse or pointer over the user name (which is located in a specific area of the page) and select/click the User Name to access a list of all the roles and options that may be selected;

b. The user then scrolls the mouse to the intended role on the list and selects/clicks the mouse to initiate a change of role for the user or person.

Alternatively, when using an embodiment of the inventive system and methods, a user will be able to perform the selection operations using only the keyboard to navigate:

1. The Instruction Shell is initially in the "Search Mode";
2. The user will type the role that they want to to change to, e.g., "Event Committee";
3. The system will locate the matching text from the code used to implement the user interface, and detect the need to switch to "Action Mode"; and
4. Once in the "Action Mode" the user will hit the [Enter] (or Return) key on the keyboard, which will initiate the change of role in the appropriate field.

The detection of a need to switch to or access a specific mode may be implemented, for example, as follows. Once a unique search hit is located, the instruction shell determines the type of the result; if the result is:

Text (e.g., a label), then the system will stay in the Search mode—because there is neither a data entry possible nor an action that could be taken;

Input field identifier (e.g., for a text box), then the system will move the cursor in the text box and attempt to detect additional key strokes to be interpreted as a value to be typed into the box; if a user types "H1", which is a HTML tag but may also have an ID on a field, then the system will ignore all the HTML tags;

Anchor tag or an input field of type button, then the system will move the focus/cursor onto the input field and expect the user to hit the <Enter> key on the keyboard.

As an illustration of this logic, assume the system is in the search mode and detects that the user has just finished typing the word "Event". The system continues to run the search process in real-time across the HTML page; initially it may find one or more occurrences of the search term for example, "New Event", "Event Committee" and "Event Manager". At this stage the system continues to stay in the "Search Mode". As soon as the user starts typing "Com" the system locates a unique hit ("Event Committee"). At this point the system determines that there is a hit which is of the type "input". With this detection, the system shell switches into "Action Mode". Once in this mode, the system will ignore any keystroke except for "Enter" or "Esc". When the input "Enter" is received, the system will make the request the user wants to complete. Note that the search process runs on the HTML code of the webpage and not over the included JAVAScript code.

Note that if the user types "Spook Inc" in the Instruction Shell during step #2 above, the system will open/display the list on the UI and let the user enter additional text to determine a single desired match. The Instruction Shell will preserve the instructions during the page scope but will retain nothing more; this means that once the user navigates to a different page, the searches and data entry text or the actions taken from the instruction shell are cleared and a new page will have any empty notepad in the search mode. This allows the user to start fresh on a new page/form without any impact of what brought them to their current page. If the user uses a mouse to navigate to a different page/form, then the shell will be reset to empty and be in Search Mode.

Figure 6:
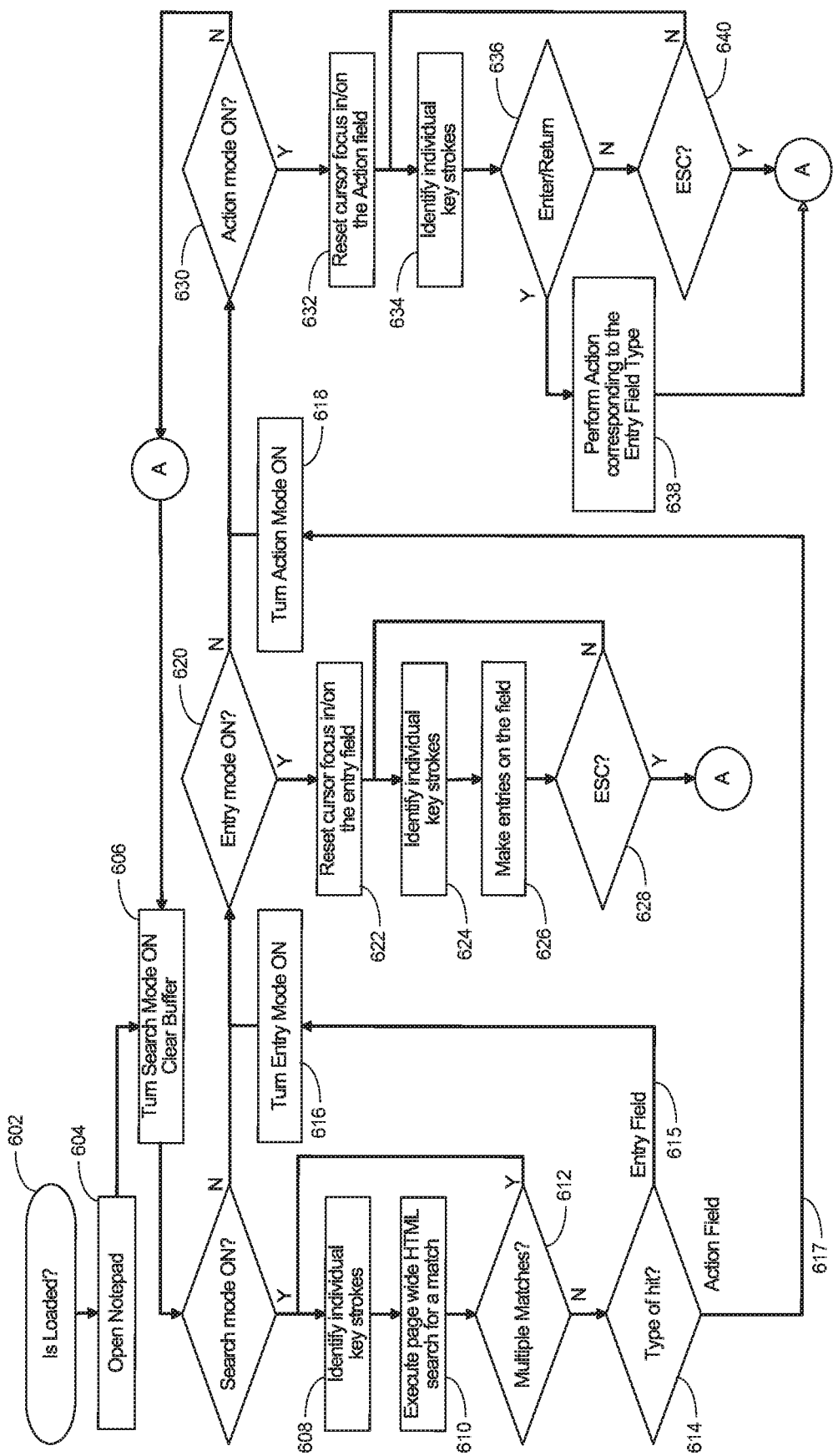
FIG. 6 is a flow chart or flow diagram illustrating certain of the operations, functions, or processes that may be implemented by an embodiment of the inventive system and methods.

FIG. 6 is a flow chart or flow diagram illustrating certain of the operations, functions, or processes that may be implemented by an embodiment of the inventive system and methods. As shown in the figure, in some embodiments, the inventive method may be initiated when a webpage (suggested by "HTML page is Loaded" in the figure) is loaded and rendered by a browser (as suggested by step or stage 602). The webpage may present a document, form, or set of data entry fields or regions to a user.

Upon loading of the page, an embodiment of the "Notepad" is opened (step or stage 604). Such an embodiment may be represented as described with reference to the "Instruction Shell" of FIG. 4 or FIG. 5. The "Notepad" launches with every HTML page load. The "Instruction Shell" or "Notepad" lives as long as the HTML page lives. The page contents may change, but typically, the Notepad will only be closed with the closing of the browser or by selection of a special function key (such as "F8").

When the Instruction Shell/Notepad launches/opens, it initializes in the "Search" mode with a clear buffer (as suggested by step or stage 606). The user may then start typing their search terms/words into the indicated region, which are recognized by the system (as suggested by step or stage 608). The inventive system responds by executing a real-time HTML page search at every keystroke (step or stage 610). The search process continues until the system identifies a unique "hit" on the page. Note that typically, the search doesn't include the HTML code (for e.g., "href"), but instead searches the values in the attributes or the text between tags. In some embodiments, the search does not include the textual values contained in the text fields.

If more than a single "hit" is found (as suggested by the "Y" branch of step or stage 612), then control passes back to step or stage 608. Steps 608, 610, and 612 operate to identify a single most likely "hit" based on the text or string entered by the user. Once such a single "hit" is identified, the logic determines the type or category of the result (as suggested by step or stage 614). If the "hit" is an entry field (corresponding to branch 615), then control is passed to step or stage 616 where the "Entry" mode is activated. If the type of "hit" identified at step 614 is an action field (corresponding to branch 617), then control is passed to step or stage 618 where the "Action" mode is activated.

From step or stage 616, control is passed to step or stage 620, which verifies that the "Entry" mode is activated. If it is, then the cursor focus is set/reset to the text or data entry field (as suggested by step or stage 622). A user then enters a keystroke or keystrokes representing the text, text string, or alphanumeric characters that they wish to insert in the field; these are detected and identified (as suggested by step or stage 624). The user entries are then placed into the field (as suggested by step or stage 626). The logic will then determine if the user has entered the "Esc" key, as suggested by step or stage 628. Note that in one embodiment, once a unique Entry Field (Text Field, Text Area, Combo Box) is identified, a cursor is placed inside the field and the system enters text "Entry" mode. This logic ensures that the subsequent keystrokes will be entered in the Entry Field(s) as data/value(s).

In some embodiments, at any point during the process, if the user hits the "Esc" key, then the system will enter into the "Search" mode and clear the buffer (note that this behavior may be driven by the user's preference; for example, the buffer may be cleared at every "Esc" key entry, when the page/form navigates to a different page/form, or when the user session ends). If the user hits the "ESC" key while in the "Search" mode, then the system will ignore it and continue to be in its present state without clearing the buffer.

If during the search mode, the system identifies/detects an Action Field (Radio Button, Check Box, List Box, Button, Link, etc.), then it switches into the "Action" mode (as suggested by step or stage 618). Control is passed to step or stage 630, which verifies that the "Action" mode is activated. If it is, then the cursor focus is set/reset to the Action field (as suggested by step or stage 632). A user then enters a keystroke or keystrokes representing the desired action or selection; these are detected and identified (as suggested by step or stage 634). The logic will then determine if the user has entered a Return/Enter key as suggested by step or stage 636. If the user has entered a Return/Enter key, then the Action corresponding to the user's keystroke entries is executed or initiated, as suggested by step or stage 638. The system then determines if the user has entered an "Esc" key, indicating a desire to exit the present Action mode, as suggested by step or stage 640.

Note that if the user thinks that they have landed on an action in error, they may select the "Esc" key to leave the "Action" mode and go back into the "Search" mode. For example, selecting the "Enter" key on a Button field will perform the 'buttonClick' or 'ButtonDown' function(s); selecting the "Space" key on a Check Box will toggle the check mark into the field. The inventive system may also operate to recognize special keys, such as "Tab", "Arrow/Scroll" keys, "Caps Lock", "Num Lock", "Function", "CTRL", "ALT", "COMMAND", etc. and perform the corresponding action on the HTML page.

FIG. 7 is a diagram illustrating an example of the client-side HTML code for creating the data entry form section in a complex enterprise application, and that may be used when implementing an embodiment of the inventive system and methods. This code (or its equivalent) will cause the display of a user interface of the type shown in FIG. 4. FIG. 8 is a diagram illustrating an example of the client-side HTML code for creating the UI navigation section in a complex enterprise application, and that may be used when implementing an embodiment of the inventive system and methods. This code (or its equivalent) will cause the display of a user interface of the type shown in FIG. 5.

Another example of a use of the inventive system and methods is one that combines form or webpage navigation with data entry, for purposes of a login operation. In this example, a user is presented with an embodiment of the inventive user interface and uses the interface to efficiently and easily obtain access to a system, resource, device, or application:

A structured enterprise application presents a console-like view (e.g., dedicated real estate on the UI) to a user—this serves as the primary area for the data entry operator to use for tasks while using the UI;

Such a console will typically have minimal structure; in a way, it is similar to a plain notepad that is attached to the application UI;

The user (e.g., a data entry operator) launches the basic UI of the application;

As an example use of the interface/console, assume that the user desires to perform a login task;

The user types "login" in the console region and the system (browser) responds by navigating the user to the login page of the application; note that the user doesn't click or select a browser link to navigate;

The user is presented with fields to enter a username and password; while continuing to use the console, the user types a keyword that uniquely identifies the field on the page/form, for example "user", and in response the system performs the following operations/functions As the user types the string, the system starts searching for a link, a field or fields, etc. on the form; the user is navigated to the control (hyperlink, textbox, etc.) that corresponds to the input into the console;

The user continues typing until a unique control is located on the current page;

The user has been provided with a cursor inside the "username" text box and enters/types their username, followed by pressing the "Esc" key to start a process for searching for the next control on the form (in this example, the "Password" field);

The user now starts typing the string "pass" to find and locate the "Password" field on the page/form. As soon as the password field is located, the system places the cursor in the field so that the user may type the password value;

Fields such as password, PIN, SSN, etc. in which data privacy is important may be assigned a behavior such that when the user types the values for these fields in the console, the system stops showing the input characters;

Once the password is entered, the user presses the "Esc" key to prepare the system for the next command;

The user starts to type the string "Go" which takes the user to the "Go" button on the page/form;

This causes the system to move the focus to the "Go" button;

The user may then enter a combination of keystrokes, a "hot key", or other shortcut that result in the system submit the form, or select the "enter" key to provide a new command;

On the new line, the user may type the string "Submit" and in response the system will submit the form for authentication/login;

The application navigation and data entry then continues via use of the unstructured notepad console.

Figure 9:
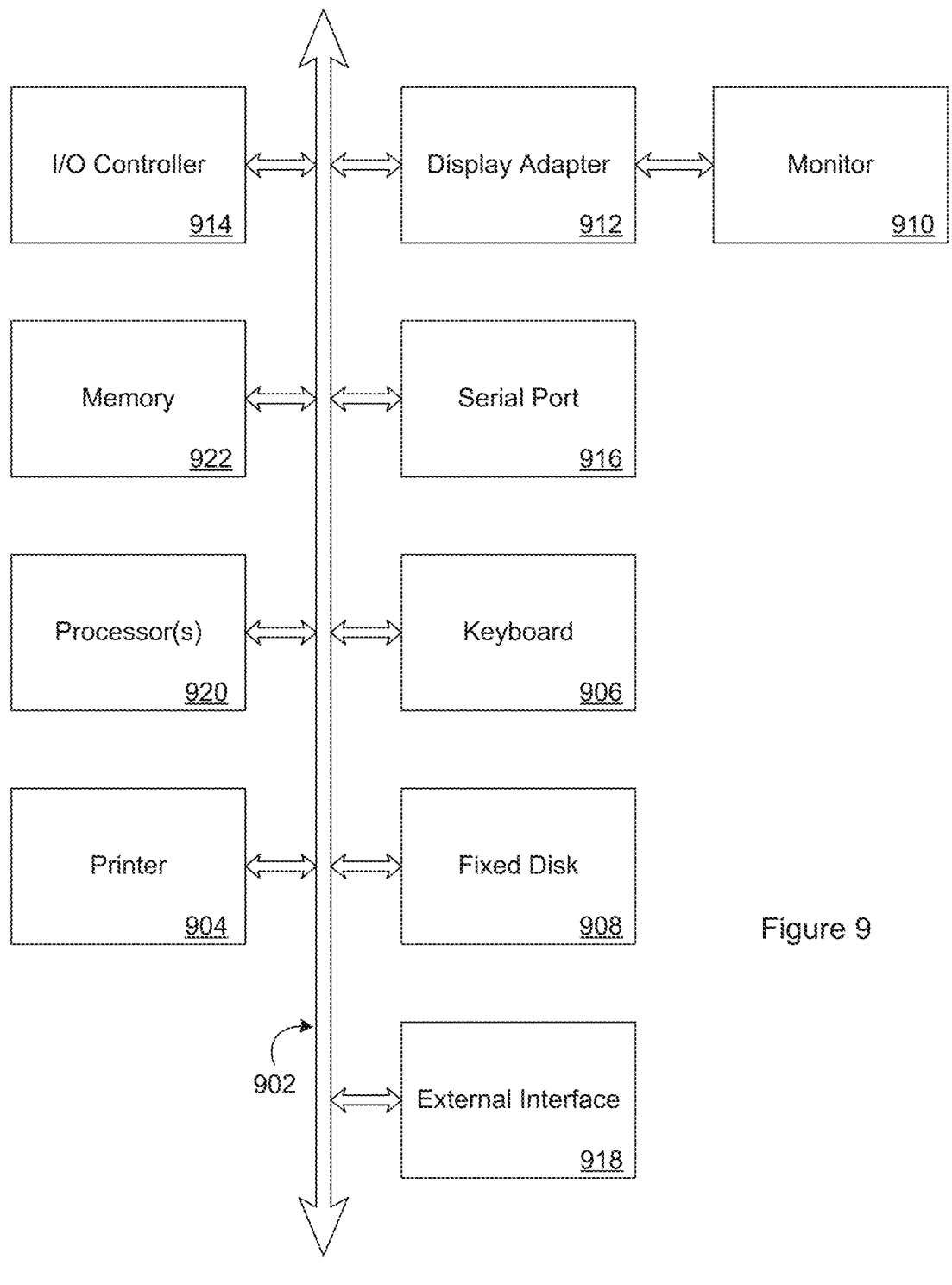
FIG. 9 is a diagram illustrating elements or components that may be present in a computer device or system configured to implement a method, process, function, or operation in accordance with an embodiment of the invention.

In accordance with at least one embodiment of the invention, the system, apparatus, methods, processes, functions, and/or operations described herein may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 9 is a diagram illustrating elements or components that may be present in a computer device or system 900 configured to implement a method, process, function, or operation in accordance with an embodiment of the invention. The subsystems shown in FIG. 9 are interconnected via a system bus 902. Additional subsystems include a printer 904, a keyboard 906, a fixed disk 908, and a monitor 910, which is coupled to a display adapter 912. Peripherals and input/output (I/O) devices, which couple to an I/O controller 914, can be connected to the computer system by any number of means known in the art, such as a serial port 916. For example, the serial port 916 or an external interface 918 can be utilized to connect the computer device 900 to further devices and/or systems not shown in FIG. 9 including a wide area network such as the Internet, a mouse input device, and/or a scanner. The interconnection via the system bus 902 allows one or more processors 920 to communicate with each subsystem and to control the execution of instructions that may be stored in a system memory 922 and/or the fixed disk 908, as well as the exchange of information between subsystems. The system memory 922 and/or the fixed disk 908 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, JAVA, JAVAScript, C++ or PERL using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A system for generating a user interface, comprising:
an electronic data storage element;
a set of executable instructions contained in the data storage element;
an electronic processor, which when programmed to execute the set of instructions causes the system to:
generate a display including a first region in a web browser into which user input is entered and a second region in the web browser containing user interface elements of a web page;
while the first region is in a search mode:
detect the user input as a series of keystrokes input into the first region;
as each keystroke is detected, trigger a search, using currently inputted keystrokes into the first region, to search source code, tags, attributes, or identifiers associated with the user interface elements of the web page to determine whether any of the user interface elements match the currently inputted keystrokes, wherein the search is triggered for each keystroke as each keystroke is detected until a single user interface element is identified as a unique match; and
switch the first region from the search mode to a data entry mode and placing a cursor over the user interface element in response to
(i) the search identifying the user interface element as uniquely matching the currently inputted keystrokes, and
(ii) the system detecting that the user interface element is an entry field; and
while the first region is in the data entry mode:
copy data, input into the first region, into the user interface element; and
in response to receiving a keystroke mapped to an exit command, transition the first region from the data entry mode to the search mode.

2. The system of claim 1, wherein the second region includes a form or a selectable button.

3. The system of claim 1, wherein the exit command is mapped to one of an Esc key, an Enter key, or a Ctrl key.

4. The system of claim 1, wherein the exit command is mapped to a specific key or key combination previously selected by the user.

5. The system of claim 1, wherein the set of instructions cause the system to:
in response to (i) a further search identifying a selectable user interface element as uniquely matching the currently inputted keystrokes, and (ii) the system detecting that the selectable user interface element is an action field, switch the first region into an action mode; and
while the first region is in the action mode, perform an action upon the selectable user interface element based upon a command received through the first region.

6. The system of claim 5, wherein the action that can be initiated by the user is entering into a sticky note mode.

7. The system of claim 1, wherein the display containing the first and second regions is generated in response to one of the user launching a browser, using a browser, or launching an application.

8. The system of claim 1, further comprising if a result of the search is not a unique match, then the first region continues to remain in the search mode awaiting for further user input to be entered into the first region.

9. A method of interacting with a user of a device, comprising:
generating, by a processor, a display including a first region in a web browser into which user input is entered and a second region in the web browser containing user interface elements of a web page;
while the first region is in a search mode:
detecting, by the processor, the user input as a series of keystrokes input into the first region;
as each keystroke is detected, triggering, by the processor a search, using currently inputted keystrokes into the first region, to search source code, tags, attributes, or identifiers associated with the user interface elements of the web page to determine whether any of the user interface elements match the currently inputted keystrokes, wherein the search is triggered for each keystroke as each keystroke is detected until a single user interface element is identified as a unique match;
detecting, by the processor, that the user interface element is an entry field; and
switching, by the processor, the first region from the search mode to a data entry mode and placing a cursor over the user interface element in response to the detection that the user interface element is an entry field; and
while the first region is in the data entry mode:
copying, by the processor, data, input into the first region, into the user interface element; and
in response to receiving a keystroke mapped to an exit command, transitioning, by the processor, the first region from the data entry mode to the search mode.

10. The method of claim 9, further comprising:
in response to (i) a further search identifying a selectable user interface element as uniquely matching the currently inputted keystrokes, and (ii) detecting that the selectable user interface element is an action field, switch the first region into an action mode; and
while the first region is in the action mode, performing an action upon the selectable user interface element based upon a command received through the first region.

11. The method of claim 10, wherein the selectable user interface element is one of a button, an icon, or a hyperlink.

12. The method of claim 11, wherein the action that can be initiated by the user is entering into a sticky note mode.

13. The method of claim 11, wherein the action that can be initiated by the user is a debug mode that displays within the first region one or more print statements of one or more client-side scripts.

14. The method of claim 9, wherein the exit command is mapped to one of an Esc key, an Enter key, or a Ctrl key.

15. The method of claim 9, wherein the exit command is mapped to a specific key or key combination previously selected by the user.

16. The method of claim 9, wherein the display containing the first and second regions is generated in response to one of the user launching a browser, using a browser, or launching an application.

17. The method of claim 9, further comprising:
if a result of the search is not a unique match, then retaining the first region in the search mode while awaiting for further user input to be entered into the first region, wherein (i) the first region is a shell window that remains open when an application displays a data entry form in the second region, and
(ii) a keystroke entered in the first region while the first region is in the data entry mode is displayed in both the first region and the user interface element;

in response to
(i) a further search identifying a selectable user interface element as uniquely matching the currently inputted keystrokes, wherein the selectable user interface element is one of a button, an icon, or a hyperlink, and
(ii) detecting that the selectable user interface element is an action field, switch the first region into an action mode;

while the first region is in the action mode, performing an action upon the selectable user interface element based upon a command received through the first region;

in response to receiving the keystroke mapped to an exit command, transitioning, by the processor, the first region from the action mode to the search mode, wherein the keystroke mapped to the exit command is one of an Esc key, an Enter key, or a Ctrl key.

18. The method of claim 9, further comprising, while the first region is in the data entry mode, displaying a keystroke entered into the first region both in the first region and in the user interface element.

* * * * *